Sept. 27, 1960  M. J. MACK ET AL  2,953,935
POWER TRAIN AND CONTROL MECHANISM
Filed Dec. 1, 1958  2 Sheets-Sheet 1

INVENTORS
M.J. MACK,
E.H. FLETCHER, &
J.R. HARVEY

Sept. 27, 1960   M. J. MACK ET AL   2,953,935
POWER TRAIN AND CONTROL MECHANISM
Filed Dec. 1, 1958   2 Sheets-Sheet 2
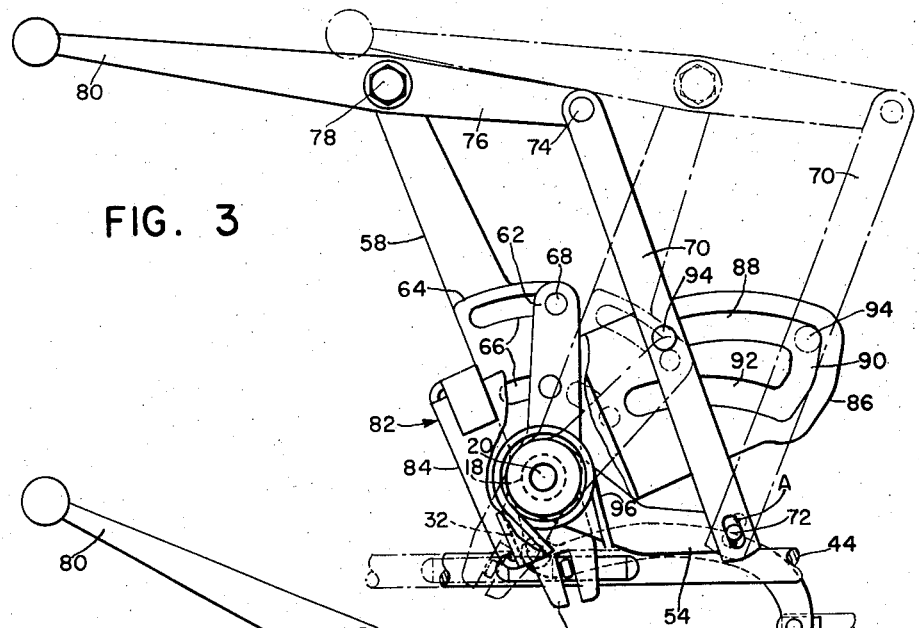
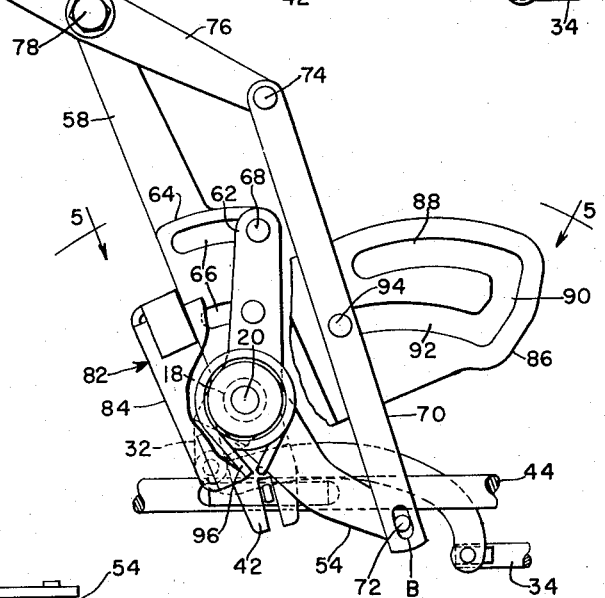
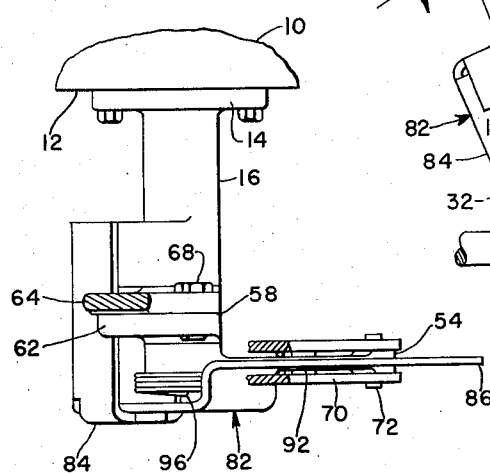
INVENTORS
M.J. MACK
E.H. FLETCHER &
J.R. HARVEY

United States Patent Office 2,953,935
Patented Sept. 27, 1960

2,953,935
POWER TRAIN AND CONTROL MECHANISM

Michael J. Mack, Waterloo, and Edward H. Fletcher and James R. Harvey, Cedar Falls, Iowa, assignors to Deere & Company, Moline, Ill., a corporation of Delaware Filed Dec. 1, 1958, Ser. No. 777,413

7 Claims. (Cl. 74—473)

This invention relates to a power train and control mechanism therefor and more particularly to a power train having a pair of disconnectible means operative in series and control means for causing these means to function in the desired sequence.

The invention finds particular utility in the control of a power take-off, as in an agricultural tractor, wherein the engine or transmission contains a drive shaft which is connected by a friction clutch to an intermediate shaft which is in turn connected to the power take-off shaft by a positive clutch. When it is desired to idle the power take-off shaft, the positive clutch is disengaged. When the power take-off shaft is in use but must be intermittently stopped, the positive clutch is engaged and the friction clutch is used for the intermittent engagement and disengagement. Heretofore, the operation of the two clutches has been achieved by two control levers. According to the present invention, a single control means is provided and is arranged so that the sequential operation of the two clutches occurs in the desired order; that is, when the power take-off shaft is disconnected, the control means functions to first disengage the friction clutch, then to engage the positive clutch and then to reengage the friction clutch, and is thereafter operative to engage and disengage the friction clutch without affecting the positive clutch. In instances in which it is desired to disconnect the power take-off shaft for a prolonged period, the control means operates to first disengage the friction clutch, then to disengage the positive clutch and then to reengage the friction clutch while leaving the positive clutch disengaged.

It is a further object of the invention to provide an improved and novel control means having relatively few parts, one that is fool-proof in operation, and one that is easily used and readily serviced. Further objects reside in improvements of the power train in which the two clutches are operative in series.

The foregoing and other important objects and desirable features inherent in and encompassed by the invention will become apparent as a preferred embodiment thereof is disclosed, by way of example, in the ensuing description and accompanying sheets of drawings, the several figures of which are described below.

Fig. 3 is an enlarged elevation of the control mechanism, illustrating one position thereof in full lines and another position in broken lines.

Fig. 4 is a similar view but illustrates a third position of the control means.

Fig. 5 is a section as seen generally along the line 5—5 of Fig. 4.

Figure 1:
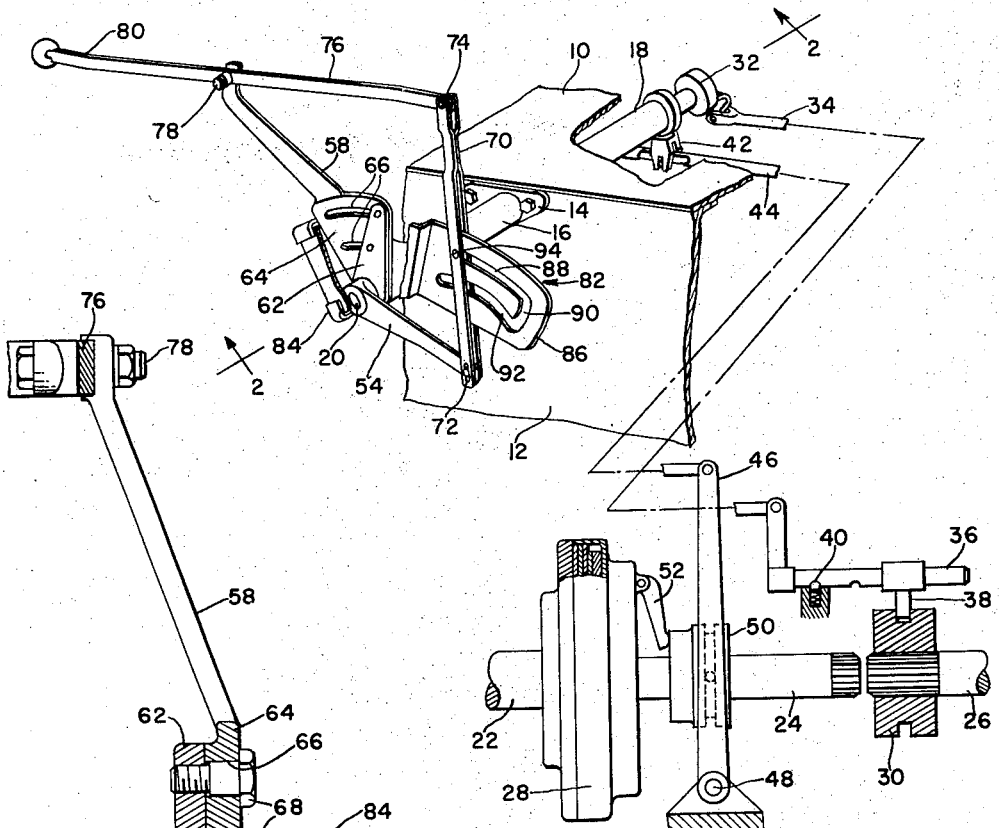
Fig. 1 is a fragmentary perspective, with portions broken away, illustrating the overall control arrangement and power train.
Figure 2:
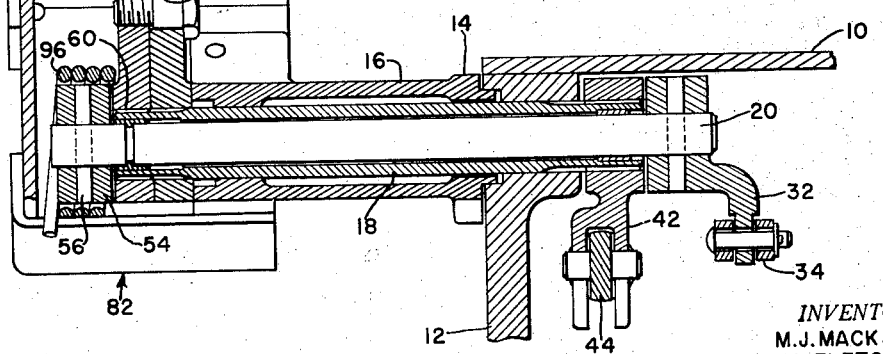
Fig. 2 is an enlarged section as seen generally along the line 2—2 of Fig. 1.

As indicated, the invention finds its greatest utility in the control of power take-off shafts in agricultural tractors and the present environment will be based thereon. The numeral 10 represents a tractor transmission case or housing having a side wall 12 in which is appropriately mounted a support 14 having a tubular portion or sleeve 16 in which is rockably carried a tubular shaft 18. A solid shaft 20 is concentrically journaled within the tubular shaft 18.

Within the transmission case and mounted in any suitable manner are a drive shaft 22, a coaxial intermediate shaft 24 and a coaxial output or power take-off shaft 26. A typical friction clutch 28 is selectively connectible and disconnectible between the shafts 22 and 24 and a clutch of the positive type, as at 30, is selectively connectible and disconnectible between the shafts 24 and 26. As shown in Fig. 1, the clutch 30 is disconnected. The clutch 28 is spring loaded to an engaged or connected position. An operating arm 32 is keyed to the inner end of the solid shaft 20 and is connected in turn by a link 34 to a throw-out rod or shaft 36 which in turn has a fork 38 connected to the clutch 30. A conventional detent 40 holds the two positions of the rod 36, which correspond to engaged and disengaged positions of the clutch 30. Stated otherwise, when the shaft 20 and arm 32 are rocked clockwise from the position shown in Fig. 1, the clutch 30 will move forwardly or to the left as seen by the reader, engaging the clutch 30 between the shafts 26 and 24, the proximate ends of which are appropriately splined as indicated.

The inner end of the tubular shaft 18 rigidly carries an arm 42 which is suitably connected by a link 44 to a throw-out lever 46 pivoted at 48 on any suitable part of the casing. The lever 46 operates conventionally in conjunction with a throw-out collar 50 which in turn operates typical clutch throw-out levers, one of which is shown at 52. When the shaft 18 and arm 42 are rocked in a clockwise direction as seen in Fig. 1, the lever 46 is rocked forwardly about its pivot 58 to cause the throw-out collar 50 to depress the clutch lever 52 for disengaging the clutch 28. The spring loading in the clutch (not shown) restores the clutch to engaged position.

The mechanism for controlling the power train just described is external to the casing 10, whereas the power train is within the casing, with the exception of the power take-off shaft 26 which, in a typical situation, will project rearwardly at the back of the tractor for connection to associated implements used with the tractor. The significance of the arrangement of the two clutches 28 and 30 in series is, as already briefly described, that when it is desired to use the power take-off shaft 26, the clutch 30 will be connected and the clutch 28 will be selectively engaged and disengaged to control the intermittent operation of the power take-off shaft. When the power take-off shaft is desired to be disconnected for prolonged periods, the clutch 30 can be disconnected. This avoids the necessity of using an overcenter arrangement on the clutch 28 to disconnect the power take-off shaft, as has been used on prior occasions.

The control mechanism is mounted at the outer or left hand end of the support sleeve 16 which, as previously described, serves to journal the two concentric shafts 18 and 20. The outer end of the shaft 20 carries a rearwardly extending arm 54, and the connection is rigid, as by a pin 56. A second arm or member 58 is keyed at 60 to the outer end of the tubular shaft 18. The member or arm 58 may be made up of two pieces, one of which at 62 carries the key 60 and the other of which at 64 is adjustably connected to the part 62 by slots 66 and cap screws 68. This arrangement enables angular adjustment of the parts 62 and 64 relative to each other about the common axis of the shafts 18 and 20. The two arms 54 and 58 are interconnected by linkage including a first link 70 comprising a pair of straps pivoted at 72 at their lower ends to the free or rear end of the arm 54 and rising therefrom to a terminal end carrying a pivot 74. Another part of the linkage is a second link or lever 76 pivotally connected to the link 70 at 74 and fulcrumed at 78 on the upper or free end of the arm or member 58. A forward extension of the link or lever 76 serves as a handle 80 for convenience of the operator. The pivots at 72, 74 and 78 are on axes parallel to the common axis of the shafts 18 and 20.

The handle 80 constitutes a single means for controlling both clutches, which is accomplished by means of a guide 82 having a forward portion 84 rigidly secured to the support sleeve 16 and a rearward plate-like portion 86 in which are formed first, second and third slots 88, 90 and 92, respectively. A guide or track follower 94 controls the linkage 70-76 via the tracks or guides afforded by the three slots just described so that the clutches 28 and 30 operate in sequence in a manner to be outlined below.

Figs. 1 and 3 show (the latter in full lines) the position of the control mechanism when the clutch 28 is engaged and the clutch 30 is disengaged. In this status, the arm 54 occupies a position in which its pivot 72 is in what may be termed a first position, hereinafter referred to as position "A." The follower 94 is in the forward part of the upper arcuate slot 88, which is arcuate about the point A as a center. Consequently, the operator, by means of the handle 80, may rock the member or arm 58 about the common axis of the shafts 18 and 20, rocking the shaft 18, since the member 58 is keyed to the shaft 20 at 60. This will disengage the clutch 28 via the arm 42, link 44, lever 46, throw-out collar 50 and clutch lever 52. Since the slot 88 is arcuate about point A, the link 70 will merely swing about point A and will have no effect on the clutch 30. Therefore, the clutch 28 may be engaged and disengaged without changing the position of the clutch 30.

When the member 58 is moved to its full rear position so that the follower 94 is at the rear end of the slot 88, or at the upper intersection of the slot 88 with the cross-over slot 90, as shown in broken lines in Fig. 3, the handle 80 may be pulled upwardly to rock the link 76 about its fulcrum 78 on the rearwardly positioned member 58, which transmits a force in compression to the link 70 which in turn is converted to rocking movement of the solid shaft 20 as the link 70 pushes down on the arm 54, thereby swinging the arm 32 forwardly and pulling forwardly on the link 34 and rod 36 so that the clutch 30 is shifted forwardly to connect the shafts 24 and 26. This connection of the clutch 30 occurs while the clutch 28 is retained in disengaged position, which occurs when the follower 94 moves to the rear end of the upper slot 88 and is confined to the rear position as it travels downwardly in the cross-over slot 90. Rocking of the lever 80 as aforesaid is against the action of a torsion spring 96 which acts between the arm 54 and the front part 84 of the guide 82.

After the clutch 30 is engaged or connected between the two shafts 24 and 26, which, as stated above, occurs while the clutch 28 is disengaged, the clutch 28 may be reengaged by returning the member 58 forwardly. However, at this time, the follower 94 travels forwardly in the lower slot 92, which is arcuate about the new position B of the pivot 72 of the arm 54, as shown in Fig. 4. With both clutches engaged, power is transmitted to the power take-off shaft 26 and the transmission of power may be intermittently interrupted by disengaging the clutch 28 without disturbing the clutch 30, which will result as long as the member 58 is rocked fore-and-aft with the follower 94 remaining in the lower arcuate slot 92. When it is desired to disconnect the clutch 30, as for prolonged idleness of the power take-off shaft 26, the member 58 is moved rearwardly, with the follower 94 running in the lower arcuate slot 92, which effects disengagement of the clutch 28. When the follower 94 reaches the intersection of the slots 90 and 92, downward pressure on the handle 80, assisted by the spring 96, causes the follower 94 to travel upwardly in the cross over slot 90, resulting in counterclockwise rocking of the arm 54, which thereby turns the shaft 20 in the same direction so as to shift the clutch 30 rearwardly to its disconnected position. Thereafter, the arm 58 may be returned forwardly by the handle 80, the follower 94 traveling again in the upper arcuate slot 88 so as to reengage the clutch 28 while leaving the clutch 30 disengaged.

Thus, there has been provided an improved power train with two clutches operative in series, plus a simplified control means for operating the clutches in the aforesaid sequence by means of the single control handle 80 and the related linkage and guide means. Features other than those described above will readily occur to those versed in the art, as will many modifications and alterations in the preferred embodiment disclosed, all of which may be achieved without departure from the spirit and scope of the invention.

What is claimed is:

1. Control mechanism, comprising: a support; an arm rockable on the support between first and second positions and having a pivot thereon spaced from the rocking axis; a member movable on the support independently of the arm and in a plane generally parallel to the plane of rocking of said arm and having a pivot thereon parallel to and spaced from both the rocking axis and the arm pivot; a first link connected to the arm pivot and extending generally in the direction of the member to a terminal end spaced from the member pivot; a second link connected to the member pivot and extending to and pivotally connected to the terminal end of the first link on an axis parallel to said pivots; a track follower on one of the links in spaced relation to both pivots; a first guide on the support arcuate about the arm pivot in the first position of said arm and receiving the follower to cause the first link to swing about the arm pivot as the member moves, whereby to avoid rocking of the arm; a second guide on the support generally normal to and leading from the first guide and receiving the follower upon swinging of the first link as the member moves whereby the follower departs from the first guide to enable shifting of the first link and rocking of the arm to its second position; and a third guide on the support leading from the second guide in spaced relation to the first guide and arcuate about the arm pivot in the second position of the arm to cause the first link to swing about said second positioned arm pivot as the member moves subsequently, whereby to again avoid rocking of the arm.

2. The invention defined in claim 1, including: a first shaft rockable on the support and carrying the arm; and a second shaft rockable on the support coaxial with the first shaft and carrying member.

3. The invention defined in claim 2, in which: one of said shafts is tubular and the other shaft is concentrically received within said tubular shaft.

4. The invention defined in claim 1, including: a rigid element on the support having first, second and third slots respectively providing said first, second and third guides.

5. The invention defined in claim 1, including: an extension on the second link beyond the member pivot and affording a handle by means of which the second link is rockable about said member pivot as a fulcrum to cause the follower to follow the second guide.

6. Power transmitting means, comprising: first, second, and third shafts; a first clutch operative selectively to connect and disconnect the first and second shafts; a second clutch operative selectively to connect and disconnect the second and third shafts; a support; an arm rockable on the support between first and second positions for respectively engaging and disengaging the second clutch and having a pivot thereon spaced from the rocking axis; a member movable on the support independently of the arm and in a plane generally parallel to the plane of rocking of said arm for engaging and disengaging the first clutch and having a pivot thereon parallel to and spaced from both the rocking axis and the arm pivot; a first link connected to the arm pivot and extending generally in the direction of the member to a terminal end spaced from the member pivot; a second link connected to the member pivot and extending to and pivotally connected to the terminal end of the first link on an axis parallel to said pivots; a track follower on one of the links in spaced relation to both pivots; a first guide on the support arcuate about the arm pivot in the first position of said arm and receiving the follower to cause the first link to swing about the arm pivot as the member moves to disengage the first clutch, whereby to avoid rocking of the arm and thus leaving the second clutch engaged; a second guide on the support generally normal to and leading from the first guide and receiving the follower upon swinging of the first link as the member moves whereby the follower departs from the first guide to enable shifting of the first link and rocking of the arm to its second position so as to disengage the second clutch while the first clutch is disengaged; and a third guide on the support leading from the second guide in spaced relation to and extending generally in the same direction as the first guide and arcuate about the arm pivot in the second position of the arm to cause the first link to swing about said second positioned arm pivot as the member moves subsequently to reengage the first clutch, whereby to again avoid rocking of the arm and thus leaving the second clutch disengaged.

7. The invention defined in claim 6, in which: the first clutch is a friction clutch and the second clutch is a positive clutch.

References Cited in the file of this patent

UNITED STATES PATENTS 1,483,231    Maynard _____ Feb. 24, 1924